United States Patent
Huang et al.

(10) Patent No.: US 11,961,277 B2
(45) Date of Patent: Apr. 16, 2024

(54) IMAGE INFORMATION DETECTION METHOD AND APPARATUS AND STORAGE MEDIUM

(71) Applicant: Tsinghua University, Beijing (CN)

(72) Inventors: Gao Huang, Beijing (CN); Shiji Song, Beijing (CN); Haojun Jiang, Beijing (CN); Le Yang, Beijing (CN); Yiming Chen, Beijing (CN)

(73) Assignee: Tsinghua University, Beijing (CN)

( * ) Notice: Subject to any disclaimer, the term of this patent is extended or adjusted under 35 U.S.C. 154(b) by 296 days.

(21) Appl. No.: 17/562,980

(22) Filed: Dec. 27, 2021

(65) Prior Publication Data

US 2022/0245923 A1    Aug. 4, 2022

(30) Foreign Application Priority Data

Jan. 25, 2021  (CN) .......................... 202110109437.9

(51) Int. Cl.
| | |
|---|---|
| G06V 10/00 | (2022.01) |
| G06F 18/22 | (2023.01) |
| G06V 10/44 | (2022.01) |
| G06V 10/77 | (2022.01) |
| G06V 10/774 | (2022.01) |

(52) U.S. Cl.
CPC .......... G06V 10/443 (2022.01); G06F 18/22 (2023.01); G06V 10/7715 (2022.01); G06V 10/774 (2022.01)

(58) Field of Classification Search
CPC ............ G06V 10/443; G06V 10/7715; G06V 10/774; G06V 10/82; G06V 20/13; G06V 10/462; G06V 10/75; G06F 18/22; G06F 18/2413; G06N 3/08; G06T 2207/20081; G06T 2207/20084

See application file for complete search history.

(56) References Cited

U.S. PATENT DOCUMENTS 11,520,077 B2 * 12/2022 Denli ................. G01V 1/28
2023/0049533 A1 * 2/2023 He .................... G06T 11/00

* cited by examiner

*Primary Examiner* — Molly Wilburn
*Assistant Examiner* — Ahmed A Nasher
(74) *Attorney, Agent, or Firm* — Bayramoglu Law Offices LLC

(57) ABSTRACT

A method for detecting image information includes: acquiring at least one sample of image pair to be processed; calculating a reconstruction loss function of the second feature extraction model based on the first image samples and the first reconstructed image feature information; calculating an adversarial loss function of the third feature extraction model based on the second reconstructed image feature information and the first image samples; optimizing the first model parameters in the first feature extraction model based on the reconstruction and the adversarial loss function to generate the optimized first feature extraction model; inputting the acquired image pair to be processed into the optimized first feature extraction model to generate the difference information. The method reduces the first feature extraction model's dependence on the labeled data and improves the model's recognition efficiency and accuracy by using the samples without the labeled difference information.

20 Claims, 3 Drawing Sheets

IMAGE INFORMATION DETECTION METHOD AND APPARATUS AND STORAGE MEDIUM

CROSS REFERENCE TO THE RELATED APPLICATIONS

This application is based upon and claims priority to Chinese Patent Application No. 202110109437.9, filed on Jan. 25, 2021, the entire contents of which are incorporated herein by reference.

TECHNICAL FIELD

The disclosure relates to the technical field of computers, and particularly relates to an image information detection method and apparatus and a storage medium.

BACKGROUND

Remote sensing usually refers to the technology of observing the Earth system or other celestial bodies by imaging in specific electromagnetic spectrum on a space or air platform, and then obtaining information on various characteristics of the observed objects. With the improvement of remote sensing technology and the increase of remote sensing satellites, the type, quantity and quality of collected remote sensing images are improving, which provides the data basis for the research of remote sensing images, and at the same time, how to extract useful information from the raw remote sensing data is gradually becoming an important research topic.

The remote sensing image change detection task refers to analyzing images taken under two time points in the same geographical area and thus obtaining information on surface changes. This technology has rich application scenarios, such as analyzing the change of forest area to respond quickly to ecological environment changes, managing natural resources and protecting ecological environment; analyzing the change of urban land area or land use to plan and supervise urban land. Therefore, change detection technology is closely related to national economy, national resources and other aspects, and has important application value. In recent years, deep learning technology is in full swing and has achieved remarkable results in some classical computer vision tasks, and practical products based on deep learning technology are also appearing in real life. However, sufficient labeled data is needed to train effective deep learning models, and in the field of remote sensing, labeled data is currently scarce, and it requires huge human cost to obtain sufficient labeled data.

SUMMARY

The objective of some embodiments of the disclosure it to provide an image information detection method, which overcomes the problem of a low precision of detection models when there is no labeled data.

The method includes:
acquiring at least one sample of image pair to be processed, wherein the first image samples and the second image samples of the same region acquired at two different time points are used as the samples of image pair to be processed;
inputting the samples of image pair to be processed into the first feature extraction model to be trained, extracting the difference feature information between the first image samples and the second image samples;
inputting the second image feature information corresponding to the second image samples and the difference feature information into the second feature extraction model, and reconstructing the first reconstructed image feature information corresponding to the first image sample by the second feature extraction model;
calculating the reconstruction loss function of the second feature extraction model based on the first image samples and the first reconstructed image feature information;
inputting the difference feature information into the third feature extraction model and obtaining the second reconstructed image feature information corresponding to the first image samples by the third feature extraction model;
calculating the adversarial loss function of the third feature extraction model based on the second reconstructed image feature information and the first image samples;
optimizing the first model parameters in the first feature extraction model based on the reconstruction loss function and the adversarial loss function to generate the optimized first feature extraction model;
inputting the acquired samples of image pair to be processed into the optimized first feature extraction model to generate difference information between the first image samples and the second image samples in the samples of image pair to be processed.

Optionally, inputting the samples of image pair to be processed into the first feature extraction model including the front feature extraction module, outputting the first image feature information corresponding to the first image samples, and the second image feature information corresponding to the second image samples;
inputting the first image feature information and the second image feature information into the posterior feature extraction module included in the first feature extraction model, outputting the difference feature information.

Optionally, constructing the adversarial loss function based on the absolute value of the difference information between the first image samples and the second reconstructed image feature information, and the similarity of the first image samples and the second reconstructed image feature information.

Optionally, optimizing the third feature extraction model using the adversarial loss function of the third feature extraction model, the step including:
performing the backward derivation of the adversarial loss function, updating the third model parameters corresponding to the third feature extraction model based on the gradient corresponding to the third model parameters in the adversarial loss function after the backward derivation, and accumulating the number of updates to the first training generation.
repeating the step of inputting the difference feature information in at least one sample of image pair to be processed into the third feature extraction model to the step of updating the third model parameters corresponding to the third feature extraction model based on the gradient corresponding to the third model parameters in the adversarial loss function after backward derivation until the first training generation is currently greater than the first total training generation, stopping optimization and saving an currently optimized third feature extraction model.

Optionally, initializing the first training number of the second feature extraction model and the second training number of the third feature extraction model and alternately training the second feature extraction model and the third feature extraction model, wherein the step of performing the alternate training is:

optimizing the adversarial loss function of the third feature extraction model when the value after doing a remainder operation on the second training generation based on the sum of the first training number and the second training number is greater than the first training number, and, optimizing the reconstruction loss function of the second feature extraction model when the value after doing the remainder operation on the second training generation is less than the first training number until the current second training generation is greater than the second total training generation, stopping the optimization and updating the first model parameters based on the adversarial loss function and the reconstruction loss function.

Optionally, inputting at least one of the difference feature information into the third feature extraction model to generate the second reconstructed image feature information;

constructing the adversarial loss function based on the absolute value of the difference information between the first image samples and the second reconstructed image feature information, and the similarity of the first image samples and the second reconstructed image feature information;

performing a backward derivation of the adversarial loss function, updating the third model parameter and the first model parameter based on the gradients corresponding to the third model parameter and the first model parameter, respectively, in the adversarial reconstruction loss function after the backward derivation, and optimizing the adversarial loss function based on the third model parameter and the first model parameter.

Optionally, inputting into the second feature extraction model at least one pair of image feature information including the second image feature information and the difference feature information to generate the first reconstructed image feature information;

constructing the reconstruction loss function based on the absolute value of the difference information between the first image samples and the first reconstructed image feature information, and the similarity between the first image samples and the first reconstructed image feature information;

performing backward derivation of the reconstruction loss function, updating the second model parameters and the first model parameters based on the gradients corresponding to the second model parameters and the first model parameters in the reconstruction loss function after backward derivation, and optimizing the reconstruction loss function based on the second model parameters and the first model parameters.

Optionally, inputting at least one sample of image pair to be processed into the first feature extraction model optimized based on the updated first model parameters, generating the difference information;

calculating a cross-entropy loss function of the first feature extraction model based on the obtained difference labeling information corresponding to at least one sample of image pair to be processed and the difference information, and updating the first model parameters based on the cross-entropy loss function until the current third training generation is greater than the third total training generation, stopping the optimization, and updating the first model parameters.

In another embodiment of the present invention, there is provided an apparatus for detecting image information, the apparatus including:

an acquiring module for acquiring at least one sample of image pair to be processed, wherein a first image samples and a second image samples of the same region acquired at two different points in time are used as the samples of image pair to be processed;

the first extracting module for inputting the samples of image pair to be processed into a first feature extraction model to be trained, extracting difference feature information between the first image samples and the second image samples;

a reconstructing module for inputting the second image feature information corresponding to the second image samples and the difference feature information into a second feature extraction model and reconstructing the first reconstructed image feature information corresponding to the first image samples by the second feature extraction model;

the first calculating module for calculating a reconstruction loss function of the second feature extraction model based on the first image samples and the first reconstructed image feature information;

the second extracting module for inputting the difference feature information into a third feature extraction model and obtaining, through the third feature extraction model, the second reconstructed image feature information corresponding to the first image samples;

the second calculating module for calculating an adversarial loss function of the third feature extraction model based on the second reconstructed image feature information and the first image samples;

an optimizing module for optimizing the first model parameters in the first feature extraction model based on the reconstruction loss function and on the adversarial loss function, generating the optimized first feature extraction model;

a generating module for inputting the acquired image pair to be processed into the optimized first feature extraction model, generating difference information between the first image and the second image in the image pair to be processed.

In another embodiment of the present invention, there is provided a non-instantaneous computer readable storage medium, characterized in that the non-instantaneous computer readable storage medium stores instructions, the instructions when executed by a processor causing the processor to perform the individual steps in a method for detecting image information as described above.

In another embodiment of the present invention, there is provided a terminal device characterized in that it includes a processor, the processor being used to perform the individual steps of a method for detecting image information as described above.

Based on the above embodiment, at least one sample of image pair to be processed is acquired, wherein the first image sample and the second image samples of the same region acquired at two different points in time are used as the sample of image pair to be processed; inputting the samples of image pair to be processed into the first feature extraction model to be trained, extracting the difference feature information between the first image sample and the second image samples; inputting the second image feature information and the difference feature information corresponding to the second image samples into the second feature extraction model, and reconstructing the first reconstructed image feature information corresponding to the first image sample by the second feature extraction model; calculate the reconstruction loss function of the second feature extraction model based on the first image sample and the first reconstructed image feature information; input the difference feature information into the third feature extraction model and obtain the second reconstructed image feature information corresponding to the first image sample through the third feature extraction model; compute the adversarial loss function of the third feature extraction model based on the second reconstructed image feature information and the first image sample; optimization of the first model parameters in the first feature extraction model based on the reconstruction loss function and the adversarial loss function to generate the optimized first feature extraction model; the acquired image pair to be processed is fed into the optimized first feature extraction model to generate the difference information between the first image and the second image in the image pair to be processed. This embodiment of disclosure reduces the reliance of the first feature extraction model on labeled data and improves the recognition efficiency and recognition accuracy of the model by using image pairs of samples without labeled difference information.

BRIEF DESCRIPTION OF THE DRAWINGS

In order to more clearly illustrate the technical solution of the embodiments of the disclosure, the following is a brief description of the drawings required for use in the embodiments. It should be understood that the following drawings only illustrate certain embodiments of the disclosure and therefore should not be regarded as limiting the scope, and that other relevant drawings may be obtained by those of ordinary skill in the art without creative effort.

DETAILED DESCRIPTION OF THE EMBODIMENTS

The following will be a clear and complete description of the technical solutions in the embodiments of this disclosure in conjunction with the accompanying drawings in the embodiments of this disclosure. Obviously, the described embodiments are only a part of the embodiments of this disclosure, and not all of them. Based on the embodiments in the disclosure, all other embodiments obtained by a person of ordinary skill in the art without making creative labor fall within the scope of protection of the disclosure.

The terms "first", "second", "third", "fourth", etc. (if present) in the specification and claims of the disclosure and in the accompanying drawings above are used to distinguish similar objects and need not be used to describe a particular order or sequence. ", etc. (if present) are used to distinguish similar objects and need not be used to describe a particular order or sequence. It should be understood that the data so used may be interchangeable, where appropriate, so that embodiments of the disclosure described herein can be implemented, for example, in an order other than those illustrated or described herein. In addition, the terms "including" and "having", and any variations thereof, are intended to cover non-exclusive inclusion. For example, a process, method, system, product, or apparatus including a series of steps or units need not be limited to those steps or units clearly listed, but may include other steps or units not clearly listed or inherent to those processes, methods, products, or apparatus.

Figure 1:
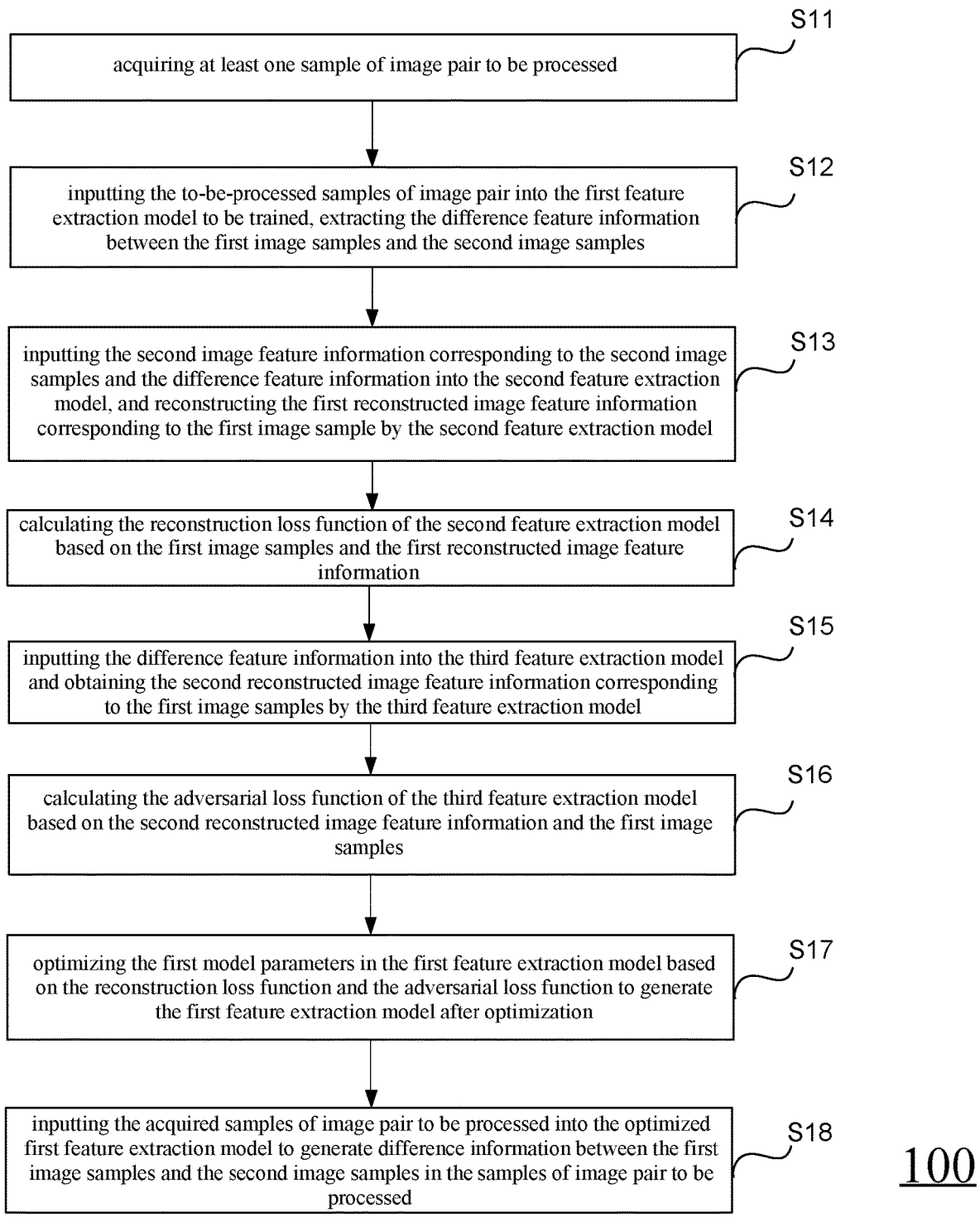
FIG. 1 shows a flow diagram of a method for detecting image information provided for embodiment 100 of the disclosure.

Based on the problems in the prior art, the embodiment of the disclosure provides a method for detecting image information, which is mainly applicable to the field of computer technology. Firstly, by mapping the unlabeled image data pairs into the depth feature space, the difference feature information between the image pairs is extracted using a backbone model. Secondly, the extracted difference feature information is combined with the feature information of the second image in the original image pair, and the information of the first image is reconstructed by a reconstruction decoder, and the reconstructed image information is supervised using the real image data to calculate the reconstruction loss function, and this loss is optimized by a stochastic gradient descent algorithm to obtain a backbone model with stronger ability to extract difference feature information; meanwhile, in order to prevent the backbone model obtains a mundane solution, i.e., simply replicating the first image information, the introduction of an adversarial decoder suppresses its convergence to a mundane solution. Finally, the pre-trained backbone model is further optimized on a limited number of annotations to obtain the final model to implement a method for detecting image information. Several specific embodiments below can be combined with each other, and the same or similar concepts or processes may not be repeated in some embodiments. As shown in FIG. 1, a schematic diagram of a process of a method for detecting image information provided by embodiment 100 of the disclosure. Among them, the detailed steps are as follows:

Step S11, acquiring at least one sample of image pair to be processed.

In this step, the samples of image pair to be processed in the embodiments of the disclosure are mainly the first image samples and the second image samples of the same region acquired at two different time points.

Step S12, inputting the samples of image pair to be processed into the first feature extraction model to be trained, extracting the difference feature information between the first image samples and the second image samples.

In this step, the first feature extraction model is mainly a backbone neural network designed according to the UNet neural network structure for extracting the difference feature information between the first image samples and the second image samples in the samples of image pair to be processed. Wherein, the first feature extraction model includes a front feature extraction module and a back feature extraction module. Specifically, the samples of image pair to be processed are first input to the front feature extraction module, and the first image feature information corresponding to the first image samples and the second image feature information corresponding to the second image samples are output respectively. Further, the first image feature information and the second image feature information are input to the back feature extraction module to generate the difference feature information between the first image samples and the second image samples.

Step S13, inputting the second image feature information corresponding to the second image samples and the difference feature information into the second feature extraction model, and reconstructing the first reconstructed image feature information corresponding to the first image sample by the second feature extraction model.

In this step, the second feature extraction model mainly consists of a reconstructed neural network with multiple function layers arranged according to ResNet rules. The second image feature information and the difference feature information are input to the second feature extraction model, and the first reconstructed image feature information corresponding to the first image sample is output.

Step S14, calculating the reconstruction loss function of the second feature extraction model based on the first image samples and the first reconstructed image feature information.

In this step, the reconstructed loss function of the second feature extraction model is calculated using the first reconstructed image feature information and the difference portion information between the first image samples.

Step S15, inputting the difference feature information into the third feature extraction model and obtaining the second reconstructed image feature information corresponding to the first image samples by the third feature extraction model.

In this step, in order to suppress the posterior feature extraction module in the first feature extraction model from obtaining a tame solution, i.e., to directly copy the information of the first image sample into the difference feature information, a third feature extraction model can be built as an adversarial neural network to suppress the posterior feature extraction module in the first feature extraction model from producing a tame solution. Wherein, the third feature extraction model mainly consists of a plurality of function layers arranged according to ResNet rules. Further, the difference feature information is inputted into the third feature extraction model to output the second reconstructed image feature information corresponding to the first image sample.

Step S16, calculating the adversarial loss function of the third feature extraction model based on the second reconstructed image feature information and the first image samples.

In this step, the adversarial loss function of the third feature extraction model is calculated using the information of the difference portion between the second reconstructed image feature information and the first image sample.

Step S17, optimizing the first model parameters in the first feature extraction model based on the reconstruction loss function and the adversarial loss function to generate the optimized first feature extraction model.

In this step, the reconstruction loss function and the adversarial loss function are backward-derived, and the first model parameters in the first feature extraction model are updated, and the optimized first feature extraction model is generated to complete the training of the first feature extraction model.

Step S18, inputting the acquired samples of image pair to be processed into the optimized first feature extraction model to generate difference information between the first image samples and the second image samples in the samples of image pair to be processed.

In this step, the first feature extraction model trained in the above step is used to process the image pairs to be processed to generate the difference information between the images. Wherein, the difference information can be image information or semantic information, etc.

As described above, based on the above embodiment, at least one sample of image pair to be processed is obtained, wherein the first image samples and the second image samples obtained at two different time points for the same region are used as the samples of image pair to be processed; the samples of image pair to be processed is inputted into the first feature extraction model to be trained to extract the difference feature information between the first image samples and the second image samples; the second image samples corresponding second image feature information and difference feature information into the second feature extraction model, and reconstruct the first reconstructed image feature information corresponding to the first image samples through the second feature extraction model; calculate the reconstructed loss function of the second feature extraction model based on the first image samples and the first reconstructed image feature information; input the difference feature information into the third feature extraction model, and obtain the second reconstructed image feature information corresponding to the first image samples through the third feature extraction model obtain the second reconstructed image feature information corresponding to the first image samples; calculate the adversarial loss function of the third feature extraction model based on the second reconstructed image feature information and the first image sample; optimize the first model parameters in the first feature extraction model based on the reconstructed loss function and the adversarial loss function to generate the optimized first feature extraction model; input the acquired image to be processed into the optimized The obtained image pair to be processed is inputted into the optimized first feature extraction model, and the difference information between the first image and the second image in the image pair to be processed is generated. The embodiment of disclosure reduces the reliance of the first feature extraction model on the labeled data by using the samples of image pair without the labeled difference information, and improves the recognition efficiency and recognition accuracy of the model.

Figure 2:
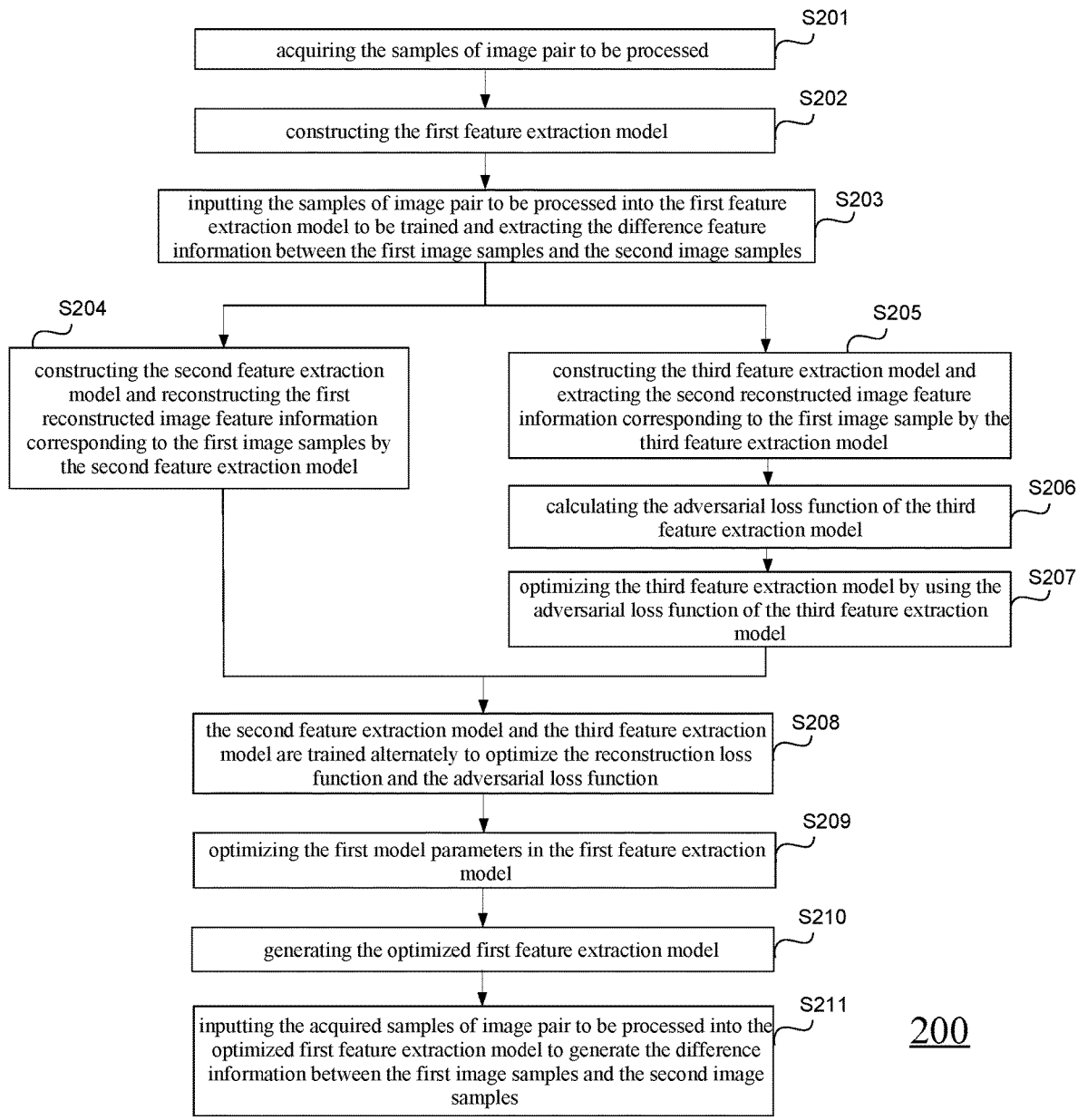
FIG. 2 shows a schematic diagram of the particular flow of the image processing method according to an embodiment 200 of the disclosure.

As shown in FIG. 2, a schematic diagram of a specific process of a method for detecting image information provided by embodiment 200 of the disclosure. Therein, the detailed process of the specific process is as follows.

S201, acquiring the samples of image pair to be processed.

Here, the samples of image pair to be processed in this embodiment of the disclosure are the first image samples and the second image samples of the same region that will be acquired at two different time points. Specifically, at least one pair of the first image sample and the second image sample of the same region acquired at two different time points is collected, wherein the k-th pair of image samples to be processed is denoted as $I_1^k$, $I_2^k$, respectively, both being a three-dimensional matrix of C×H×W, C being the number of channels of the image samples, and H and W being the height and width of the image samples, respectively. Each pair of $I_1^k$, $I_2^k$ corresponds to a difference labeling information $Y^k$, which is a two-dimensional matrix of H×W, and $Y_{i,j}^k$ takes the value of 0 or 1 to indicate whether the corresponding pixel on the image sample has changed, i.e., $Y_{i,j}^k=0$ means that the pixel located at (i, j) has not changed, and $Y_{i,j}^k=1$ means that the pixel located at j) is changed.

S202, constructing the first feature extraction model.

In this step, a backbone neural network is built as a first feature extraction model. The overall structure of this first feature extraction model is designed according to the rules of UNet segmentation network. The first feature extraction model contains a front feature extraction module and a back feature extraction module, where the front feature extraction module is composed of multiple function layers arranged according to ResNet rules or DenseNet rules by increasing the number of channel dimensions and decreasing the spatial dimensions of the features. The corresponding model parameter of the front feature extraction module is $\Theta_{\mathcal{G}_1}$. The posterior feature extraction module consists of several function layers arranged according to ResNet rules, which fuse the features of different scales generated by the anterior feature extraction module. The model parameter corresponding to the posterior feature extraction module is $\Theta_{\mathcal{G}_2}$. $\Theta_{\mathcal{G}_1}$ and $\Theta_{\mathcal{G}_2}$ are both included in the first model parameter.

S203, inputting the samples of image pair to be processed into the first feature extraction model to be trained and extracting the difference feature information between the first image samples and the second image samples.

Here, the samples of image pair to be processed are inputted into the front feature extraction module included in the first feature extraction model, and the first image feature information corresponding to the first image samples and the second image feature information corresponding to the second image samples are output; the first image feature information and the second image feature information are inputted into the back feature extraction module included in the first feature extraction model, and the difference feature information is outputted.

Specifically, at least one sample of image pair to be processed, $I_1^k$, $I_2^k$, is used as the input of the first feature extraction model, respectively, and the output feature first image feature information $F_1^k$ and second image feature information $F_2^k$ from the front feature extraction module are noted as: $F_1^k = \mathcal{G}_1(I_1^k; \Theta_{\mathcal{G}_1})$, $F_2^k = \mathcal{G}_1(I_2^k; \Theta_{\mathcal{G}_1})$, where $\mathcal{G}_1(\bullet; \Theta_{\mathcal{G}_1})$ is the transfer function of the front feature extraction module. $F_1^k$, $F_2^k$ are the representations of $I_1^k$, $I_2^k$ in the high-dimensional feature space, respectively, both are three-dimensional matrices of $C_1 \times H_1 \times W_1$, $C_1$ is the number of channel dimensions of the features, $H_1$, $W_1$ are the number of spatial dimensions of the features, both are determined by the structure of the front The structure of the feature extraction module is determined; then $F_1^k$, $F_2^k$ are inputted into the rear feature extraction module to output a difference feature information $\tilde{F}^k$, which is written as $\tilde{F}^k = \mathcal{G}_2(F_1^k, F_2^k; \Theta_{\mathcal{G}_2})$. where $\mathcal{G}_2(\bullet, \bullet; \Theta_{\mathcal{G}_2})$ is the transfer function of the posterior feature extraction module. $\tilde{F}^k$ encodes the difference information between $I_1^k$, $I_2^k$ as a three-dimensional matrix of $C_2 \times H_2 \times W_2$, where $C_2$ is the number of channel dimensions of the feature, and $H_2$, $W_2$ are the number of spatial dimensions of the feature, both determined by the structure of the posterior feature extraction module.

S204, constructing the second feature extraction model and reconstructing the first reconstructed image feature information corresponding to the first image samples by the second feature extraction model.

Here, a reconstructed neural network is established as the second feature extraction model, which consists of multiple function layers arranged according to the ResNet rules. If the second model parameter of this second feature extraction model is $\Theta_{\mathcal{R}}$, the second image feature information $F_2^k$ corresponding to $I_2^k$ and the difference feature information $\tilde{F}^k$ are used as the input of the second feature extraction model, and the first reconstructed image feature information $\tilde{I}_1^k$ is outputted, which is denoted as: $\tilde{I}_1^k = \mathcal{R}(F_2^k, \tilde{F}^k; \Theta_{\mathcal{R}})$ where $\mathcal{R}(\bullet, \bullet; \Theta_{\mathcal{R}})$ is the the transfer function of the second feature extraction model. where $\tilde{I}_1^k$ is reconstructed based on the difference feature information $\tilde{F}^k$ between $I_1^k$, $I_2^k$ and $F_2^k$ corresponding to $I_2^k$, and $\tilde{I}_1^k$ is a C×H×W three-dimensional matrix, C is the number of channel dimensions of the features, and H, W are the number of spatial dimensions of the features, both determined by the structure of the second feature extraction model.

5205, constructing the third feature extraction model and extracting the second reconstructed image feature information corresponding to the first image sample by the third feature extraction model.

In this step, in order to suppress the transfer function $\mathcal{G}_2(\bullet, \bullet; \Theta_{\mathcal{G}_2})$ of the posterior feature extraction module to obtain a tame solution, i.e., to directly copy the information of $I_1^k$ into $\tilde{F}^k$, an adversarial neural network needs to be built as the third feature extraction model. This third feature extraction model is composed of multiple function layers arranged according to ResNet rules, and if the third model parameter of this neural network is $\Theta_{\mathcal{A}}$, the difference feature information $\tilde{F}^k$ is used as the input of the third feature extraction model, and the second reconstructed image feature information $\bar{I}_1^k$ is output, which is noted as: $\bar{I}_1^k = \mathcal{A}(\tilde{F}^k; \Theta_{\mathcal{A}})$, where $\mathcal{A}(\bullet; \Theta_{\mathcal{A}})$ is the transfer function of the third feature extraction model, $\bar{I}_1^k$ is reconstructed from the difference feature information $\tilde{F}^k$, and $\bar{I}_1^k$ is a C×H×W three-dimensional matrix, C is the number of channel dimensions of the features, H, W are the number of spatial dimensions of the features, both determined by the third structure of the feature extraction model is determined.

S206, calculating the adversarial loss function of the third feature extraction model.

In this step, the first image samples of at least one sample of image pair to be processed is inputted into the third feature extraction model to generate the second reconstructed image feature information; an adversarial loss function is constructed based on the absolute value of the difference information between the first image sample and the second reconstructed image feature information and the similarity between the first image sample and the second reconstructed image feature information.

Specifically, the third model parameter $\Theta_{\mathcal{A}}$ is initialized with a standard normal distribution. Further, B pairs of data, noted as $(I_1^1, I_2^1), (I_1^2, I_2^2), \ldots, (I_1^B, I_2^B)$, are randomly taken from the sample of image pairs to be processed, and $I_1^k$ of them are input into the third feature extraction model to obtain B second reconstructed image feature information corresponding to $\bar{I}_1^1, \bar{I}_1^2, \ldots, \bar{I}_1^B$: $\bar{I}_1^k = \mathcal{A}(\tilde{F}^k; \Theta_{\mathcal{A}})$, k=1, 2, ..., B.

Further, the adversarial loss function $L_{\mathcal{A}}$; (A means adversarial) of the third feature extraction model is calculated as follows formula 1:

$$L_{\mathcal{A}} = \frac{1}{B} \sum_{k=1}^{B} \left[ \omega_1 \times L1\text{Loss}\left(\bar{I}_1^k, I_1^k\right) + \omega_2 \times SSIMLoss\left(\bar{I}_1^k, I_1^k\right) \right], \quad \text{formula 1}$$

where $\omega_1$, $\omega_2$ are the coefficients of L1Loss(•, •), SSIMLoss(•, •), respectively, which are usually taken as $\omega_1 = 0.15$, $\omega_2 = 0.85$.

The loss function L1Loss(•, •) is established based on the absolute value of the difference information between the first image sample and the second reconstructed image feature information, and the larger the absolute value indicates the worse the reconstruction effect, as follows in formula 2:

$$L1Loss\left(\overline{I}_1^{=k}, I_1^k\right) = \frac{1}{C \times H \times W} \sum_{c=1}^{C} \sum_{i=1}^{H} \sum_{j=1}^{W} \left| \overline{I}_{1,c,i,j}^k - I_{1,c,i,j}^k \right|. \quad \text{formula 2}$$

The similarity between the first image sample and the second reconstructed image feature information is introduced as SSIMLoss(•, •), where $\mathcal{T}$ (•, •), $\mathcal{U}$ (•, •), $\mathcal{V}$ (•, •) denote the similarity between the first image sample and the second reconstructed image feature information measured in the three dimensions of luminance, contrast, and structure. of similarity. This is expressed as follows in formula 3:

$$SSIMLoss\left(\overline{I}_1^{-k}, I_1^k\right) = \quad \text{formula 3}$$
$$\frac{1}{c}\Sigma_{c=1}^{C}\left[\mathcal{T}\left(\overline{I}_{1,c}^{-k}, I_{1,c}^{k}\right)\right]^{\alpha}\left[\mathcal{U}\left(\overline{I}_{1,c}^{-k}, I_{1,c}^{k}\right)\right]^{\beta}\left[\mathcal{V}\left(\overline{I}_{1,c}^{-k}, I_{1,c}^{k}\right)\right]^{\gamma},$$

where α, β, γ are predetermined exponential terms, all of which are optimally taken as 1 in this embodiment of disclosure. the expressions of ○ $\mathcal{T}$ (•, •), $\mathcal{U}$ (•, •), $\mathcal{V}$ (•, •) are shown below.

$$\mathcal{T}(X, Y) = \frac{2\mu_X\mu_Y + D_1}{\mu_X^2 + \mu_Y^2 + D_1}, \mu_X = \frac{1}{P \times Q}\sum_{p=1}^{P}\sum_{q=1}^{Q} X_{p,q},$$

$$\mathcal{U}(X, Y) = \frac{2\sigma_X\sigma_Y + D_2}{\sigma_X^2 + \sigma_Y^2 + D_2}, \sigma_X = \left[\frac{1}{P \times Q}\sum_{p=1}^{P}\sum_{q=1}^{Q} (X_{p,q} - \mu_X)^2\right]^{\frac{1}{2}},$$

$$\mathcal{V}(X, Y) = \frac{\sigma_{XY} + D_3}{\sigma_X\sigma_Y + D_3},$$

$$\sigma_{XY} = \left[\frac{1}{P \times Q}\sum_{p=1}^{P}\sum_{q=1}^{Q} (X_{p,q} - \mu_X)(y_{p,q} - \mu_Y)\right]^{\frac{1}{2}}$$

where $$D_1 = 0.01^2, D_2 = 0.03^2, D_3 = \frac{D_2}{2},$$

X, Y denote the image matrix corresponding to the first image sample and the second reconstructed image feature information, respectively, and p, q denote the index/subscripts of the pixel points in the image matrix.

S207, optimizing the third feature extraction model by using the adversarial loss function of the third feature extraction model.

In this step, the third feature extraction model is optimized using the adversarial loss function of the third feature extraction model to achieve pre-training of the third feature extraction model. Specifically, the reverse derivation is performed for the adversarial loss function, the third model parameters corresponding to the third feature extraction model are updated based on the gradients corresponding to the third model parameters in the adversarial loss function after the reverse derivation, and the number of updates is accumulated to the first training generation; the step of inputting the difference feature information of samples of image pair to be processed into the third feature extraction model is repeated to and the step of updating the third feature extraction model corresponding to the third model parameters based on the gradients corresponding to the third model parameters in the adversarial loss function after the reverse derivation is performed to The step of updating the third model parameter corresponding to the third feature extraction model based on the gradient corresponding to the third model parameter in the loss function until the current first training generation is greater than the first total training generation, stopping the optimization and saving the currently optimized third feature extraction model.

Specifically, the initialization is set with the first training epoch number t=0 and the first total training epoch number $E_A$. Further, the backward propagation is performed for the adversarial loss function $L_A$ to obtain the third model parameter $\Theta_A$, and update $\Theta_A$ with the following formula 4:

$$\Theta_A = \Theta_A - \eta\frac{\partial L_A}{\partial \Theta_A}, \quad \text{formula 4}$$

where η is the learning rate, which is calculated by $$\eta = \eta_A\left(1 - \cos\left(\frac{t}{E_A}\right)\right)$$

as me guiding information to update $\Theta_A$, where cos represents the cosine function and $\eta_A$ is the initial learning rate.

Every time the third model parameter $\Theta_A$ is updated, make the first training epoch number $t_1=t_1+1$. Compare the current training epoch number $t_1$ with the value of the first total training epoch number, and use $t_1 > E_A$ as the judgment criterion for training termination. Specifically, if $t_1 \leq E_A$, the adversarial loss function $L_A$ is repeatedly obtained and the third model parameter $\Theta_A$ is updated; until $t_1 > E_A$, the optimization is stopped and the currently optimized third feature extraction model is saved.

S208, the second feature extraction model and the third feature extraction model are trained alternately to optimize the reconstruction loss function and the adversarial loss function.

In this step, the first training iteration number of the second feature extraction model and the second training iteration number of the third feature extraction model are initialized, and the second feature extraction model and the third feature extraction model are alternately trained, wherein the step of performing alternate training is shown below:

When the value of the remainder operation of the second training epoch number based on the sum of the first training iteration number and the second training iteration number is greater than the first training iteration number, the adversarial loss function of the third feature extraction model is optimized, and, when the value of the remainder operation of the second training epoch number is less than the first training iteration number, the reconstruction loss function of the second feature extraction model is optimized until the current second training epoch number is greater than the second total training epoch number, the optimization is stopped, and the first model parameters are updated based on the adversarial loss function and the reconstruction loss function.

Specifically, the first model parameters $\Theta_{G_1}, \Theta_{G_2}$ and the second model parameters $\Theta_R$ obtained from the previous steps are initialized with the optimized $\Theta_\mathcal{A}$ in a standard normal distribution. Set the second training epoch number $t_2=0$, and set the second total training epoch number as E. Set the iteration iter=0 in each training epoch, and set the number of alternate training of $\Theta_\mathcal{R}$, $\Theta_\mathcal{A}$ as $\text{iter}_\mathcal{R}$, $\text{iter}_\mathcal{A}$, respectively. Further, if the residual operation $t_2$ mod ($\text{iter}_\mathcal{R} + \text{iter}_\mathcal{A}$)< $\text{iter}_\mathcal{R}$ is done for the second training epoch number, update the reconstructed loss function of the second feature extraction model and optimize the corresponding model parameters; conversely, update the adversarial loss function of the third feature extraction model and optimize the corresponding adversarial loss function. Where, for each parameter update, $t_2=t_2+1$, $t_2=n*(\text{iter}_\mathcal{R}+\text{iter}_\mathcal{A})+\text{reminder}$, n denotes the number of epoch that have been alternatively trained, and the remainder takes values from 0 to ($\text{iter}_\mathcal{R} + \text{iter}_\mathcal{A} -1$).

Random B samples of image pair to be processed, denoted as $(I_1^1,I_2^1)$, $(I_1^2,I_2^2)$, ..., $(I_1^B,I_2^B)$, and image pair $(I_1^k,I_2^k)$ are inputted into the first feature extraction model, and B second image feature information $F_2^1$, $F_2^2$, ..., $F_2^B$ corresponding to the second image samples $I_2^k$, and B difference feature information $\tilde{F}^1, \tilde{F}^2, \ldots, \tilde{F}^B$ are obtained according to the following formula:

$F_1^k = \mathcal{G}_1 (I_1^k; \Theta_{\mathcal{G}_1})$, $k=1,2,\ldots,B$, $F_2^k = \mathcal{G}_1 (I_2^k; \Theta_{\mathcal{G}_1})$, $k=1,2,\ldots,B$, $\tilde{F}^k = \mathcal{G}_2 (F_1^k, F_2^k; \Theta_{\mathcal{G}_2})$, $k=1,2,\ldots,B$.

Optionally, the step of optimizing the reconstructed loss function of the second feature extraction model includes:
inputting at least one pair of image feature information including the second image feature information and the difference feature information into the second feature extraction model to generate the first reconstructed image feature information; constructing a reconstructed loss function based on absolute values of the difference information between the first image sample and the first reconstructed image feature information, and similarities between the first image samples and the first reconstructed image feature information; backwardly deriving the reconstructed loss function, update the second model parameters and the first model parameters respectively based on the gradients corresponding to the second model parameters and the first model parameters in the reconstruction loss function after the reverse derivation, and optimize the reconstruction loss function based on the second model parameters and the first model parameters.

Specifically, at least one pair of the second image feature information and the difference feature information $(F_2^1,\tilde{F}^1)$, $(F_2^2,\tilde{F}^2)$, ..., $(F_2^B,\tilde{F}^B)$ is inputted into the second feature extraction model, and at least one reconstructed first reconstructed image feature information $\bar{I}_1^1, \bar{I}_1^2, \ldots, \bar{I}_1^B$ is obtained according to the following formula:

$\bar{I}_1^k = \mathcal{R}(F_2^k, \tilde{F}^k; \Theta_\mathcal{R})$, $k=1,2,\ldots,B$.

Further, similar to the adversarial loss function, the reconstruction loss function $L_\mathcal{R}$ (R stands for reconstruction) is obtained as follows in formula 5:

$L_\mathcal{R} = \Sigma_{k=1}^B [\omega_1 \times L1\text{Loss}(\bar{I}_1^k, I_1^k) + \omega_2 \times \text{SSIMLoss}(\bar{I}_1^k, I_1^k)]$    formula 5

The backward derivative of the reconstructed loss function $L_\mathcal{R}$ is obtained, and the partial derivatives of $L_\mathcal{R}$ with respect to the first model parameters $\Theta_{\mathcal{G}_1}$, $\Theta_{\mathcal{G}_2}$ and the second model parameter $\Theta_\mathcal{R}$, $$\frac{\partial L_R}{\partial \Theta_{\mathcal{G}_1}}, \frac{\partial L_R}{\partial \Theta_{\mathcal{G}_2}}, \frac{\partial L_R}{\partial \Theta_\mathcal{R}}$$

are updated, and $\Theta_{\mathcal{G}_1}$, $\Theta_{\mathcal{G}_2}$, $\Theta_\mathcal{R}$ are updated as follows:

$$\Theta_{\mathcal{G}_1} = \Theta_{\mathcal{G}_1} - \eta \frac{\partial L_R}{\partial \Theta_{\mathcal{G}_1}},$$

$$\Theta_{\mathcal{G}_2} = \Theta_{\mathcal{G}_2} - \eta \frac{\partial L_R}{\partial \Theta_{\mathcal{G}_2}},$$

$$\Theta_\mathcal{R} = \Theta_\mathcal{R} - \eta \frac{\partial L_R}{\partial \Theta_\mathcal{R}},$$

where $\eta$ is the learning rate and is calculated by the following formula:

$$\eta = \eta_0 \left(1 - \cos\left(\frac{t_2}{E}\right)\right).$$

Let the training epoch number $t_2=t_2+1$, make a judgment on $t_2$, if $t_2 \leq E$, continue to optimize the reconstruction loss function of the second feature extraction model; if $t_2 > E$, the training is finished.

Optionally, the step of optimizing the adversarial loss function of the third feature extraction model includes:
At least one difference feature information is inputted into the third feature extraction model to generate the second reconstructed image feature information; the adversarial loss function is constructed based on the absolute value of the difference information between the first image samples and the second reconstructed image feature information and the similarity between the first image samples and the second reconstructed image feature information; the inverse derivation is performed for the adversarial loss function, the third model parameters and the first model parameters are updated based on the gradients corresponding to the third model parameters and the first model parameters of the adversarial reconstructed loss function after the inverse derivation, and the adversarial loss function is optimized based on the third model parameters and the first model parameters.

Specifically, the B pairs of difference feature information $\tilde{F}^1, \tilde{F}^2, \ldots, \tilde{F}^B$ are inputted into the third feature extraction model, and the B reconstructed second reconstructed image feature information $\bar{\bar{I}}_1^1, \bar{\bar{I}}_1^2, \ldots, \bar{\bar{I}}_1^B$: $\bar{\bar{I}}_1^k = \mathcal{A}(\tilde{F}^k; \Theta_\mathcal{A})$, $k=1, 2, \ldots, B$.

Further, the adversarial loss function $L_\mathcal{A}$ of the third feature extraction model is calculated as follows formula 6:

$$L_\mathcal{A} = \frac{1}{B}\sum_{k=1}^B \left[\omega_1 \times L1\text{Loss}\left(\bar{\bar{I}}_1^k, I_1^k\right) + \omega_2 \times \text{SSIMLoss}\left(\bar{\bar{I}}_1^k, I_1^k\right)\right].$$    formula 6

The partial derivatives $$\frac{\partial L_\mathcal{A}}{\partial \Theta_{\mathcal{G}_2}}, \frac{\partial L_\mathcal{A}}{\partial \Theta_\mathcal{A}}$$

with respect to the first model parameter $\Theta_{\mathcal{G}_2}$ and the third model parameter $\Theta_{\mathcal{A}}$ are obtained for the backward derivative of the loss function $L_A$ and $\Theta_{\mathcal{G}_2}$, $\Theta_{\mathcal{A}}$ is updated with the following formula:

$$\Theta_{\mathcal{G}_2} = \Theta_{\mathcal{G}_2} + \eta \frac{\partial L_{\mathcal{A}}}{\partial \Theta_{\mathcal{G}_2}},$$

$$\Theta_{\mathcal{A}} = \Theta_{\mathcal{A}} - \eta \frac{\partial L_{\mathcal{A}}}{\partial \Theta_{\mathcal{A}}},$$

where η is the learning rate and is calculated by the following formula:

$$\eta = \eta_0 \left(1 - \cos\left(\frac{t_2}{E}\right)\right).$$

Let the training epoch number $t_2 = t_2 + 1$, make a judgment on $t_2$, if $t_2 \leq E$, continue to optimize the adversarial loss function of the third feature extraction model; if $t_2 > E$, end the training.

S209, optimizing the first model parameters in the first feature extraction model.

In this step, samples of image pair is inputted into the first feature extraction model optimized based on the updated first model parameters to generate difference information; based on the obtained difference labeling information and difference information corresponding samples of image pair to be processed, the cross entropy loss function of the first feature extraction model is calculated and the first model parameters are updated based on the cross entropy loss function until the current third training generation is greater than the third total training generation, the optimization is stopped, and the first model parameters are updated.

Specifically, based on the optimized parameters of each model in step S208, initialize $\Theta_{\mathcal{G}_1}$, $\Theta_{\mathcal{G}_2}$, set the third training generation $t_3 = 0$, and set the third total training generation $E_{\mathcal{G}}$.

Further, B pairs of data $(I_1^1, I_2^1), (I_1^2, I_2^2), \ldots, (I_1^B, I_2^B)$ are randomly taken from the sample of image pairs to be processed, and the corresponding difference labeling information is $\overline{Y}^1, \overline{Y}^2, \ldots, \overline{Y}^B$, and B samples of image pair to be processed $(I_1^k, I_2^k)$ are input into the first feature extraction model to obtain B difference information $Y^1, Y^2, \ldots, Y^B$ according to the following formula:

$F_1^k = \mathcal{G}_1 (I_1^k; \Theta_{\mathcal{G}_1}), k=1,2,\ldots,B,$ $F_2^k = \mathcal{G}_1 (I_2^k; \Theta_{\mathcal{G}_1}), k=1,2,\ldots,B,$ $\tilde{F}^k = \mathcal{G}_2 (F_1^k, F_2^k; \Theta_{\mathcal{G}_2}), k=1,2,\ldots,B,$ $Y^k = \mathcal{G}_3 (\tilde{F}^k; \Theta_{\mathcal{G}_3}), k=1,2,\ldots,B;$ Based on the obtained B discrepancy information $Y^1$, $Y^2, \ldots, Y^B$ and the corresponding discrepancy expression information $\overline{Y}^1, \overline{Y}^2, \ldots, \overline{Y}^B$, the cross-entropy loss function $L_{CE}$ is obtained using the following cross-entropy loss function, as follows formula 7:

formula 7

$$L_{CE} = \frac{1}{B \times H \times W} \Sigma_{b=1}^{B} \Sigma_{i=1}^{H} \Sigma_{j=1}^{W} \left[ \overline{Y}_{i,j}^{b} \times \log(Y_{i,j}^{b}) + (1 - \overline{Y}_{i,j}^{b}) \times \log(1 - Y_{i,j}^{b}) \right]$$

The partial derivatives $$\frac{\partial L_{CE}}{\partial \Theta_{\mathcal{G}_1}}, \frac{\partial L_{CE}}{\partial \Theta_{\mathcal{G}_2}}, \frac{\partial L_{CE}}{\partial \Theta_{\mathcal{G}_3}}$$

with respect to the first model parameters $\Theta_{\mathcal{G}_1}$, $\Theta_{\mathcal{G}_2}$, $\Theta_{\mathcal{G}_3}$ are obtained by backward derivatization of the cross-entropy loss function $L_{CE}$, and $\Theta_{\mathcal{G}_1}$, $\Theta_{\mathcal{G}_2}$, $\Theta_{\mathcal{G}_3}$ are updated with the following formula:

$$\Theta_{\mathcal{G}_1} = \Theta_{\mathcal{G}_1} - \eta \frac{\partial L_{CE}}{\partial \Theta_{\mathcal{G}_1}}$$

$$\Theta_{\mathcal{G}_2} = \Theta_{\mathcal{G}_2} - \eta \frac{\partial L_{CE}}{\partial \Theta_{\mathcal{G}_2}}$$

$$\Theta_{\mathcal{G}_3} = \Theta_{\mathcal{G}_3} - \eta \frac{\partial L_{CE}}{\partial \Theta_{\mathcal{G}_3}}$$

where η is the learning rate and is calculated by the following formula:

$$\eta = \eta_{\mathcal{G}} \left(1 - \cos\left(\frac{t_3}{E_{\mathcal{G}}}\right)\right),$$

where $\Theta_{\mathcal{G}_3}$ also belongs to the first model parameter, and the final difference information $Y^k$ is obtained by feeding $\tilde{F}^k$ into the network classifier, denoted as $Y^k = \mathcal{G}_3 (\tilde{F}^k; \Theta_{\mathcal{G}_3})$, where $\mathcal{G}_3 (\cdot; \Theta_{\mathcal{G}_3})$ is the transfer function of the classifier, and $Y^k$ is the final classification result, which is a two-dimensional matrix of H×W, and H, W are the number of features of the spatial dimensionality.

Let the training epoch number $t_3 = t_3 + 1$ make a judgment on $t_3$, if $t_3 \leq E_g$, continue to optimize the cross-entropy loss function $L_{CE}$; if $t_3 > E_g$, get the trained first feature extraction model and the first model parameters $\Theta_{\mathcal{G}_1}$, $\Theta_{\mathcal{G}_2}$, $\Theta_{\mathcal{G}_3}$.

The aforementioned steps S201 to S208 implement an unsupervised training process, and step S209 further adds manually labeled differential labeling information for further model optimization.

S210, generating the optimized first feature extraction model.

S211, inputting the acquired samples of image pair to be processed into the optimized first feature extraction model to generate the difference information between the first image samples and the second image samples.

Here, the difference information between images can be semantic information, or the image information of labeled differences, etc.

A method for detecting image information in this embodiment of disclosure uses the intrinsic relationships existing in image pairs to construct a self-supervised learning algorithm that can assist the model in learning features from unlabeled data that facilitate change detection, and the deep learning model trained on this basis can significantly improve the accuracy and recall rate of image change detection.

To address the drawbacks in existing deep self-supervised learning-based remote sensing image change detection methods, for example, existing methods must rely on a large amount of accurately labeled data to train deep learning models, and labeled data such as changes in remote sensing data requires a lot of human and material resources. At the same time, there is sufficient unlabeled remote sensing data, and this embodiment of disclosure uses the large amount of unlabeled data to assist the model in learning features that are beneficial for change detection in the case of limited labeled data. Firstly, after mapping the unlabeled samples of image pair to be processed into a high-dimensional feature space, the first feature extraction model backbone network model is immediately used to extract the difference feature information between the samples of image pair to be processed; combining the extracted difference feature information with the second image feature information of the second image samples in the samples of image pair to be processed, reconstructing the first reconstructed image feature information corresponding to the first image sample through the second feature extraction model reconstruction decoder, and using real image data to supervise the reconstructed image information, calculating the reconstructed loss function value, optimizing this loss through the stochastic gradient descent algorithm, and obtaining a first feature extraction model backbone network model with a stronger ability to extract difference feature information; in order to prevent the first feature extraction model backbone network model from obtaining a mediocre solution, a third feature extraction model is introduced against the decoder to inhibit its convergence to a mediocre solution. The pre-trained first feature extraction model backbone network model is further optimized on a limited number of annotations to obtain the final model.

The embodiment of disclosure effectively utilizes unlabeled image data pairs, significantly reduces the model's dependence on labeled data, effectively alleviates the problem of high cost of image labeling such as remote sensing image labeling, and improves the accuracy and recall of model detection. In addition, the process of training exposes the model to more valid training samples, which can enhance the robustness of the model and its generalization performance on new data.

Figure 3:
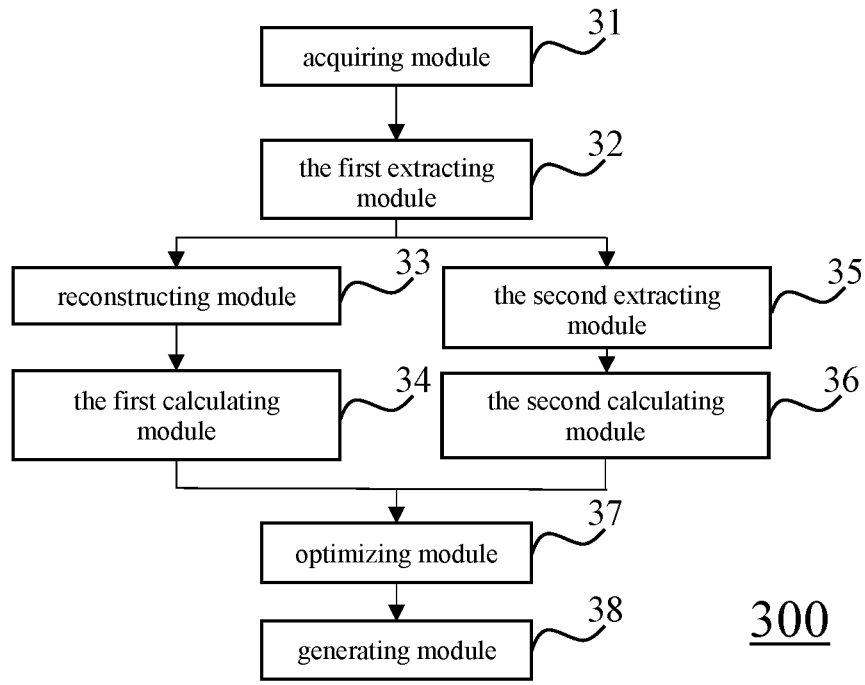
FIG. 3 shows a schematic diagram of an apparatus for detecting image information also provided by embodiment 300 of the disclosure.

Based on the same inventive concept, embodiment 300 of the disclosure further provides an image information detection apparatus, wherein, as shown in FIG. 3, the apparatus includes:

an acquiring module 31 for acquiring at least one sample of image pair to be processed, wherein the first image sample and the second image sample of the same region acquired at two different points in time is used as the sample of the image pair to be processed;

the first extracting module 32 for inputting the samples of image pair to be processed into the first feature extraction model to be trained and extracting the difference feature information between the first image sample and the second image samples;

a reconstructing module 33 for inputting the second image feature information and the difference feature information corresponding to the second image samples into the second feature extraction model and reconstructing the first reconstructed image feature information corresponding to the first image sample by means of the second feature extraction model;

the first calculating module 34 for calculating the reconstruction loss function of the second feature extraction model based on the first image sample and the first reconstructed image feature information;

the second extracting module 35 for inputting the difference feature information into the third feature extraction model and obtaining the second reconstructed image feature information corresponding to the first image sample through the third feature extraction model;

the second calculating module 36 for calculating an adversarial loss function of the third feature extraction model based on the second reconstructed image feature information and the first image sample;

an optimizing module 37 for optimizing the first model parameters in the first feature extraction model based on the reconstructed loss function and the adversarial loss function to generate the optimized first feature extraction model;

a generating module 38 for inputting the acquired image pair to be processed into the optimized first feature extraction model to generate difference information between the first image and the second image in the image pair to be processed.

In this embodiment of the disclosure, the specific functions and interactions of the acquiring module 31, the first extracting module 32, the reconstructing module 33, the first calculating module 34, the second extracting module 35, the second calculating module 36, the optimizing module 37 and the generating module 38 can be found in the account of the corresponding embodiment in FIG. 1 and will not be repeated here.

Figure 4:
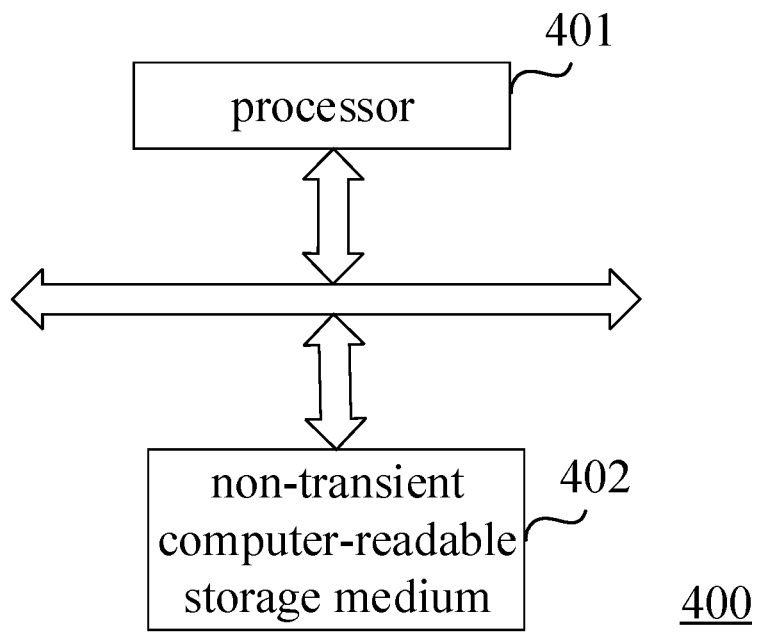
FIG. 4 shows a schematic diagram of a terminal device provided by embodiment 400 of the disclosure.

As shown in FIG. 4, a further embodiment 400 of the disclosure further provides a terminal device including a processor 401, wherein the processor 401 is used to perform the steps of a method of detecting image information as described above. As can also be seen in FIG. 4, the terminal device provided in the above embodiment further includes a non-instantaneous computer readable storage medium 402 having a computer program stored on the non-instantaneous computer readable storage medium 402, which computer program performs the steps of one of the above methods of detecting image information when run by the processor 401. In practice, the terminal device may be one or more computers, as long as it includes the computer readable medium and the processor described above.

Specifically, the storage medium can be a general-purpose storage medium, such as a removable disk, a hard disk, and FLASH, etc., on which a computer program is run that is capable of performing the various steps in one of the above-described methods for detecting image information. In practice, the computer readable medium can be contained in the device/device/system described in the above embodiment, or it can exist separately and not assembled into the device/device/system. The computer readable storage medium carries one or more programs that, when the one or more programs are executed, are capable of performing the individual steps in a method for detecting image information as described above.

According to embodiments of the disclosure, computer readable storage media may be non-volatile computer readable storage media, which may include, for example, but are not limited to: portable computer disks, hard disks, random access memory (RAM), read-only memory (ROM), erasable programmable read-only memory (EPROM or flash memory), portable compact disk read-only memory (CD-ROM) optical memory devices, magnetic memory devices, or any suitable combination of the foregoing, but not intended to limit the scope of protection of this application. In the embodiments disclosed in this application, a computer readable storage medium may be any tangible medium that contains or stores a program that may be used by or in combination with an instruction execution system, device, or device.

The flowcharts and block diagrams in the accompanying drawings of this application illustrate possible implementations of the architecture, functionality, and operation of systems, methods, and computer program products in accordance with the various embodiments disclosed in this application. At this point, each box in the flowchart or block diagram may represent a module, program segment, or portion of code, and the module, program segment, or portion of code contains one or more executable instructions for implementing a prescribed logical function. It should also be noted that in some implementations as replacements, the functions indicated in the boxes may also occur in a different order than that indicated in the accompanying drawings. For example, two connected representations of a box can actually be executed in substantially parallel, and they can sometimes be executed in the opposite order, depending on the function involved. Note also that each box in a block diagram or flowchart, and the combination of boxes in a block diagram or flowchart, may be implemented with a dedicated hardware-based system that performs the specified function or operation, or may be implemented with a combination of dedicated hardware and computer instructions.

It will be understood by those of skill in the art that the features documented in the various embodiments and/or claims of the present disclosure can be combined and/or combined in a variety of ways, even if such combinations or combinations are not expressly documented in the disclosure. In particular, without departing from the spirit and teachings of the disclosure, the features documented in the various embodiments and/or claims of the disclosure may be combined and/or combined in a variety of combinations, all of which fall within the scope of the disclosure.

Finally, it should be noted that the above described embodiments are only specific embodiments of the disclosure to illustrate the technical solution of the disclosure, not to limit it, and the scope of protection of the disclosure is not limited thereto, although the disclosure is described in detail with reference to the foregoing embodiments, it should be understood by a person of ordinary skill in the art that any person skilled in the art, within the technical scope disclosed by the disclosure, its any person skilled in the art, within the scope of the technology disclosed in this application, can still make changes or readily conceivable variations to the technical solutions recorded in the preceding embodiments, or make equivalent replacements to some of the technical features; and these changes, variations or replacements do not make the essence of the corresponding technical solutions out of the spirit and scope of the technical solutions of the embodiments of this application, and shall be covered within the scope of protection of this application. Therefore, the scope of protection of the disclosure shall be stated to be subject to the scope of protection of the claims.

What is claimed is:

1. A method for detecting image information, wherein the method comprises:
    acquiring at least one sample of image pair to be processed, wherein first image samples and second image samples of a same region acquired at two different time points are configured as samples of image pair to be processed;
    inputting the samples of image pair to be processed into a first feature extraction model to be trained, extracting difference feature information between the first image samples and the second image samples;
    inputting second image feature information corresponding to the second image samples and the difference feature information into a second feature extraction model, and reconstructing first reconstructed image feature information corresponding to the first image samples by the second feature extraction model;
    calculating a reconstruction loss function of the second feature extraction model based on the first image samples and the first reconstructed image feature information;
    inputting the difference feature information into a third feature extraction model and obtaining second reconstructed image feature information corresponding to the first image samples by the third feature extraction model;
    calculating an adversarial loss function of the third feature extraction model based on the second reconstructed image feature information and the first image samples;
    optimizing first model parameters in the first feature extraction model to be trained based on the reconstruction loss function and the adversarial loss function to generate an optimized first feature extraction model;
    inputting the samples of image pair to be processed into the optimized first feature extraction model to generate difference information between the first image samples and the second image samples in the samples of image pair to be processed.

2. The method according to claim 1, wherein the step of extracting the difference feature information between the first image samples and the second image samples comprises:
    inputting the samples of image pair to be processed into the first feature extraction model to be trained comprising a front feature extraction module, outputting first image feature information corresponding to the first image samples, and the second image feature information corresponding to the second image samples;
    inputting the first image feature information and the second image feature information into a posterior feature extraction module comprised in the first feature extraction model to be trained, outputting the difference feature information.

3. The method according to claim 1, wherein the step of calculating the adversarial loss function of the third feature extraction model based on the second reconstructed image feature information corresponding to the first image samples and the first image samples comprises:
    constructing the adversarial loss function based on an absolute value of difference information between the first image samples and the second reconstructed image feature information, and a similarity between the first image samples and the second reconstructed image feature information.

4. The method according to claim 3, wherein after the step of calculating the adversarial loss function of the third feature extraction model based on the second reconstructed image feature information corresponding to the first image samples and the first image samples, the method further comprises:
    optimizing the third feature extraction model using the adversarial loss function of the third feature extraction model, specifically comprising:
    performing a backward derivation of the adversarial loss function of the third feature extraction model, updating third model parameters corresponding to the third feature extraction model based on a gradient corresponding to the third model parameters in the adversarial loss function after the backward derivation, and accumulating a number of updates to a first training generation;

repeating the step of inputting the difference feature information into the third feature extraction model to the step of updating the third model parameters corresponding to the third feature extraction model based on the gradient corresponding to the third model parameters in the adversarial loss function after the backward derivation until the first training generation is currently greater than a first total training generation, stopping optimization and saving a currently optimized third feature extraction model.

5. The method according to claim 2, wherein the step of optimizing the first model parameters in the first feature extraction model to be trained comprises:

initializing a first training number of the second feature extraction model and a second training number of the third feature extraction model and alternately training the second feature extraction model and the third feature extraction model, wherein the step of performing an alternate training is:

optimizing the adversarial loss function of the third feature extraction model when a value, after doing a remainder operation on a second training generation based on a sum of the first training number and the second training number, is greater than the first training number, and, optimizing the reconstruction loss function of the second feature extraction model when the value, after doing the remainder operation on the second training generation, is less than the first training number until a current second training generation is greater than a second total training generation, stopping optimization and updating the first model parameters based on the adversarial loss function and the reconstruction loss function.

6. The method according to claim 5, wherein the step of optimizing the adversarial loss function of the third feature extraction model comprises:

inputting at least one of the difference feature information into the third feature extraction model to generate the second reconstructed image feature information;

constructing the adversarial loss function based on an absolute value of difference information between the first image samples and the second reconstructed image feature information, and a similarity between the first image samples and the second reconstructed image feature information;

performing a backward derivation of the adversarial loss function, updating third model parameters and the first model parameters based on a gradient corresponding to the third model parameters and a gradient corresponding to the first model parameters, respectively, in the adversarial reconstruction loss function after the backward derivation, and optimizing the adversarial loss function based on the third model parameters and the first model parameters.

7. The method according to claim 5, wherein the step of optimizing the reconstruction loss function of the second feature extraction model comprises:

inputting into the second feature extraction model at least one pair of image feature information comprising the second image feature information and the difference feature information to generate the first reconstructed image feature information;

constructing the reconstruction loss function based on an absolute value of difference information between the first image samples and the first reconstructed image feature information, and a similarity between the first image samples and the first reconstructed image feature information;

performing a backward derivation of the reconstruction loss function, updating second model parameters and the first model parameters based on a gradient corresponding to the second model parameters and the first model parameters in the reconstruction loss function after the backward derivation, and optimizing the reconstruction loss function based on the second model parameters and the first model parameters.

8. The method according to claim 5, wherein the step of updating the first model parameters based on the adversarial loss function and the reconstruction loss function comprises:

inputting at least one of the samples of image pair to be processed into the optimized first feature extraction model based on updated first model parameters, generating difference information;

calculating a cross-entropy loss function of the first feature extraction model based on obtained difference labeling information corresponding to at least one of the samples of image pairs to be processed and the difference information, and updating the first model parameters based on the cross-entropy loss function until a current third training generation is greater than a third total training generation, stopping optimization, and updating the first model parameters.

9. A device for detecting image information, comprising:

an acquiring module for acquiring at least one sample of image pair to be processed, wherein first image samples and second image samples of the same region acquired at two different points in time are configured as samples of image pair to be processed;

a first extracting module for inputting the samples of image pair to be processed into a first feature extraction model to be trained, extracting difference feature information between the first image samples and the second image samples;

a reconstructing module for inputting second image feature information corresponding to the second image samples and the difference feature information into a second feature extraction model, and reconstructing first reconstructed image feature information corresponding to the first image samples by the second feature extraction model;

a first calculating module for calculating a reconstruction loss function of the second feature extraction model based on the first image samples and the first reconstructed image feature information;

a second extracting module for inputting the difference feature information into a third feature extraction model and obtaining, through the third feature extraction model, a second reconstructed image feature information corresponding to the first image samples;

a second calculating module for calculating an adversarial loss function of the third feature extraction model based on the second reconstructed image feature information and the first image samples;

an optimizing module for optimizing first model parameters in the first feature extraction model to be trained based on the reconstruction loss function and on the adversarial loss function, generating an optimized first feature extraction model;

a generating module for inputting an acquired image pair to be processed into the optimized first feature extraction model, generating difference information between a first image and a second image in the acquired image pair to be processed.

10. A non-transitory computer readable storage medium, wherein the non-transitory computer readable storage medium stores instructions, the instructions when executed by a processor causing the processor to perform the individual steps in the method for detecting the image information as claimed in claim 1.

11. A terminal device, wherein the terminal device comprises a processor, the processor is configured to perform the individual steps of the method for detecting the image information as claimed in claim 1.

12. The non-transitory computer readable storage medium according to claim 10, wherein the method, wherein the step of extracting the difference feature information between the first image samples and the second image samples comprises:
inputting the samples of image pair to be processed into the first feature extraction model to be trained comprising a front feature extraction module, outputting first image feature information corresponding to the first image samples, and the second image feature information corresponding to the second image samples;
inputting the first image feature information and the second image feature information into a posterior feature extraction module comprised in the first feature extraction model to be trained, outputting the difference feature information.

13. The non-transitory computer readable storage medium according to claim 10, wherein the method, wherein the step of calculating the adversarial loss function of the third feature extraction model based on the second reconstructed image feature information corresponding to the first image samples and the first image samples comprises:
constructing the adversarial loss function based on an absolute value of difference information between the first image samples and the second reconstructed image feature information, and a similarity between the first image samples and the second reconstructed image feature information.

14. The non-transitory computer readable storage medium according to claim 13, wherein the method, wherein after the step of calculating the adversarial loss function of the third feature extraction model based on the second reconstructed image feature information corresponding to the first image samples and the first image samples, the method further comprises:
optimizing the third feature extraction model using the adversarial loss function of the third feature extraction model, specifically comprising:
performing a backward derivation of the adversarial loss function of the third feature extraction model, updating third model parameters corresponding to the third feature extraction model based on a gradient corresponding to the third model parameters in the adversarial loss function after the backward derivation, and accumulating a number of updates to a first training generation;
repeating the step of inputting the difference feature information into the third feature extraction model to the step of updating the third model parameters corresponding to the third feature extraction model based on the gradient corresponding to the third model parameters in the adversarial loss function after the backward derivation until the first training generation is currently greater than a first total training generation, stopping optimization and saving a currently optimized third feature extraction model.

15. The non-transitory computer readable storage medium according to claim 12, wherein the method, wherein the step of optimizing the first model parameters in the first feature extraction model to be trained comprises:
initializing a first training number of the second feature extraction model and a second training number of the third feature extraction model and alternately training the second feature extraction model and the third feature extraction model, wherein the step of performing an alternate training is:
optimizing the adversarial loss function of the third feature extraction model when a value, after doing a remainder operation on a second training generation based on a sum of the first training number and the second training number, is greater than the first training number, and, optimizing the reconstruction loss function of the second feature extraction model when the value, after doing the remainder operation on the second training generation, is less than the first training number until a current second training generation is greater than a second total training generation, stopping optimization and updating the first model parameters based on the adversarial loss function and the reconstruction loss function.

16. The non-transitory computer readable storage medium according to claim 15, wherein the method, wherein the step of optimizing the adversarial loss function of the third feature extraction model comprises:
inputting at least one of the difference feature information into the third feature extraction model to generate the second reconstructed image feature information;
constructing the adversarial loss function based on an absolute value of difference information between the first image samples and the second reconstructed image feature information, and a similarity between the first image samples and the second reconstructed image feature information;
performing a backward derivation of the adversarial loss function, updating third model parameters and the first model parameters based on a gradient corresponding to the third model parameters and a gradient corresponding to the first model parameters, respectively, in the adversarial reconstruction loss function after the backward derivation, and optimizing the adversarial loss function based on the third model parameters and the first model parameters.

17. The non-transitory computer readable storage medium according to claim 15, wherein the method, wherein the step of optimizing the reconstruction loss function of the second feature extraction model comprises:
inputting into the second feature extraction model at least one pair of image feature information comprising the second image feature information and the difference feature information to generate the first reconstructed image feature information;
constructing the reconstruction loss function based on an absolute value of difference information between the first image samples and the first reconstructed image feature information, and a similarity between the first image samples and the first reconstructed image feature information;
performing a backward derivation of the reconstruction loss function, updating second model parameters and the first model parameters based on a gradient corresponding to the second model parameters and the first model parameters in the reconstruction loss function after the backward derivation, and optimizing the reconstruction loss function based on the second model parameters and the first model parameters.

18. The non-transitory computer readable storage medium according to claim 15, wherein the method, wherein the step of updating the first model parameters based on the adversarial loss function and the reconstruction loss function comprises:
   inputting at least one of the samples of image pair to be processed into the optimized first feature extraction model based on updated first model parameters, generating difference information;
   calculating a cross-entropy loss function of the first feature extraction model based on obtained difference labeling information corresponding to at least one of the samples of image pairs to be processed and the difference information, and updating the first model parameters based on the cross-entropy loss function until a current third training generation is greater than a third total training generation, stopping optimization, and updating the first model parameters.

19. The terminal device according to claim 11, wherein the method, wherein the step of extracting the difference feature information between the first image samples and the second image samples comprises:
   inputting the samples of image pair to be processed into the first feature extraction model to be trained comprising a front feature extraction module, outputting first image feature information corresponding to the first image samples, and the second image feature information corresponding to the second image samples;
   inputting the first image feature information and the second image feature information into a posterior feature extraction module comprised in the first feature extraction model to be trained, outputting the difference feature information.

20. The terminal device according to claim 11, wherein the method, wherein the step of calculating the adversarial loss function of the third feature extraction model based on the second reconstructed image feature information corresponding to the first image samples and the first image samples comprises:
   constructing the adversarial loss function based on an absolute value of difference information between the first image samples and the second reconstructed image feature information, and a similarity between the first image samples and the second reconstructed image feature information.

* * * * *